United States Patent
Jorgensen et al.

(10) Patent No.: US 6,811,764 B2
(45) Date of Patent: Nov. 2, 2004

(54) HYDROGEN GENERATION SYSTEM USING STABILIZED BOROHYDRIDES FOR HYDROGEN STORAGE

(75) Inventors: Scott Willis Jorgensen, Bloomfield Township, Oakland County, MI (US); Belinda K. Perry, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 232 days.

(21) Appl. No.: 10/242,183

(22) Filed: Sep. 12, 2002

(65) Prior Publication Data

US 2004/0052722 A1 Mar. 18, 2004

(51) Int. Cl.[7] .................................................. C01B 3/08
(52) U.S. Cl. ...................................... 423/658.2; 429/17
(58) Field of Search .......................... 423/648.1, 658.2; 429/17

(56) References Cited

U.S. PATENT DOCUMENTS

| | | | |
|---|---|---|---|
| 4,193,978 A | 3/1980 | Muller et al. |
| 4,302,217 A | 11/1981 | Teitel |
| 5,372,617 A | 12/1994 | Kerrebrock et al. |
| 5,702,491 A | 12/1997 | Long et al. |
| 6,316,133 B1 | 11/2001 | Bossel |

OTHER PUBLICATIONS

Society of Automotive Engineers Paper No. 2000–01–1541, "Suv Powered By On–Board Generated H2," by Steven C. Amendola et al.

The Clean Fuels Report, Nov. 1999, pp. 72–74, "Sodium Borohydride Process Generates Hydrogen," Millennium Cell LLC.

International Journal of Hydrogen Energy 25 (2000) pp. 969–975, "A Safe, Portable, Hydrogen Gas Generator Using Aqueous Borohydride Solution and Ru Catalyst," by Steven C. Amendola et al.

*Primary Examiner*—Steven Bos
*Assistant Examiner*—Maribel Medina
(74) *Attorney, Agent, or Firm*—Kathryn A. Marra

(57) ABSTRACT

A method is provided that generates hydrogen to power a hydrogen consuming device. Hydrogen is stored on-board a motorized vehicle, or the like, in a stabilized slurry of alkali metal borohydride particles and water. Upon demand from the hydrogen consuming device, such as a fuel cell, a portion of the slurry is conveyed to a reactor where borohydride particles are heated so that they hydrolyze to produce hydrogen gas and solid-phase by-products. The reactor includes a mixing element therein where the slurry is mixed and ground to expose unreacted borohydride particles from the solid reaction products. A separate grinding mechanism can be used to further crush and grind by-product particles for reaction efficiency and product transport. The solid-phase by-products are then stored in a by-products storage vessel whereas hydrogen gas is delivered to either a hydrogen buffer container for temporary storage or to the hydrogen consuming device.

18 Claims, 3 Drawing Sheets

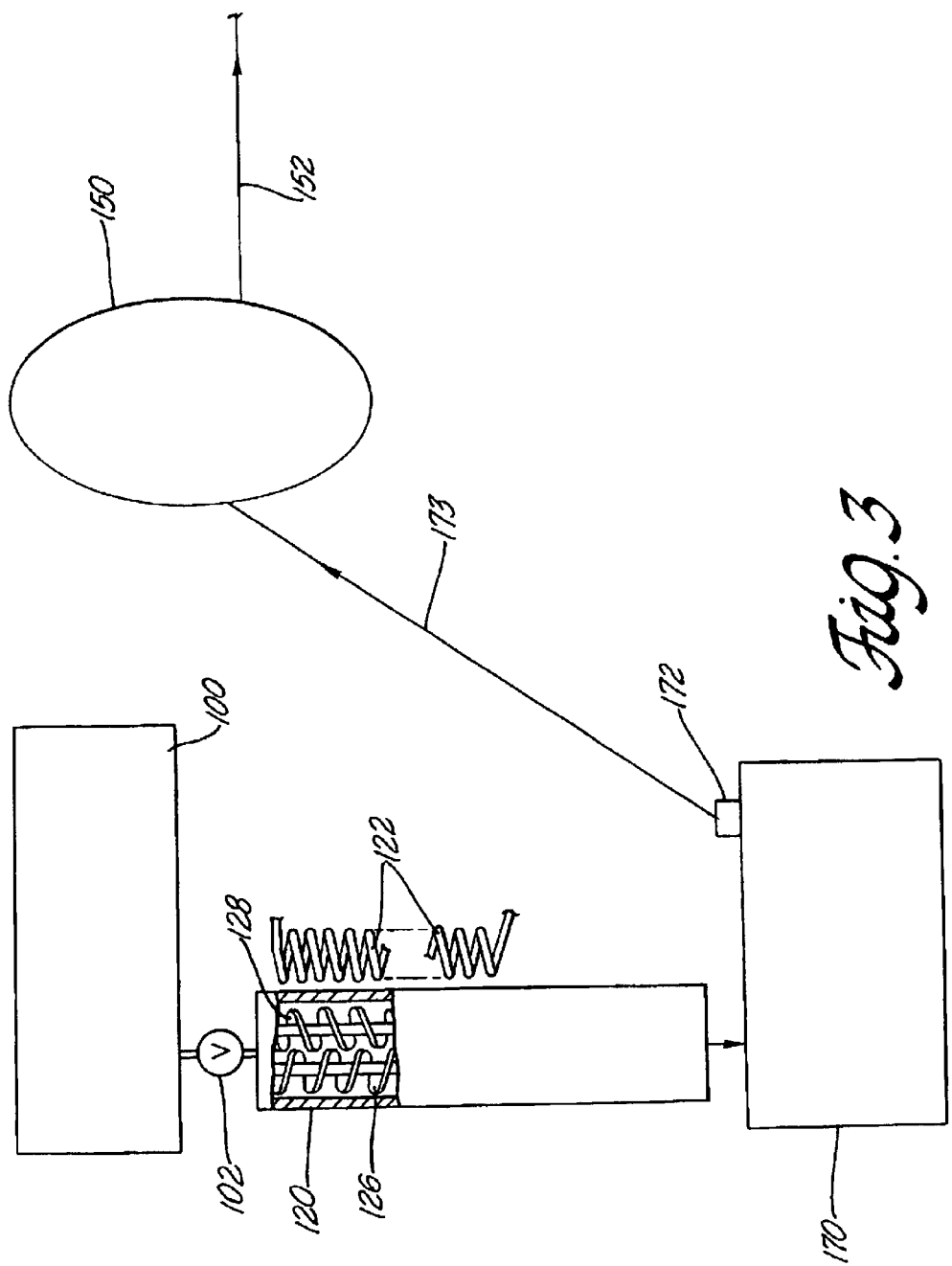

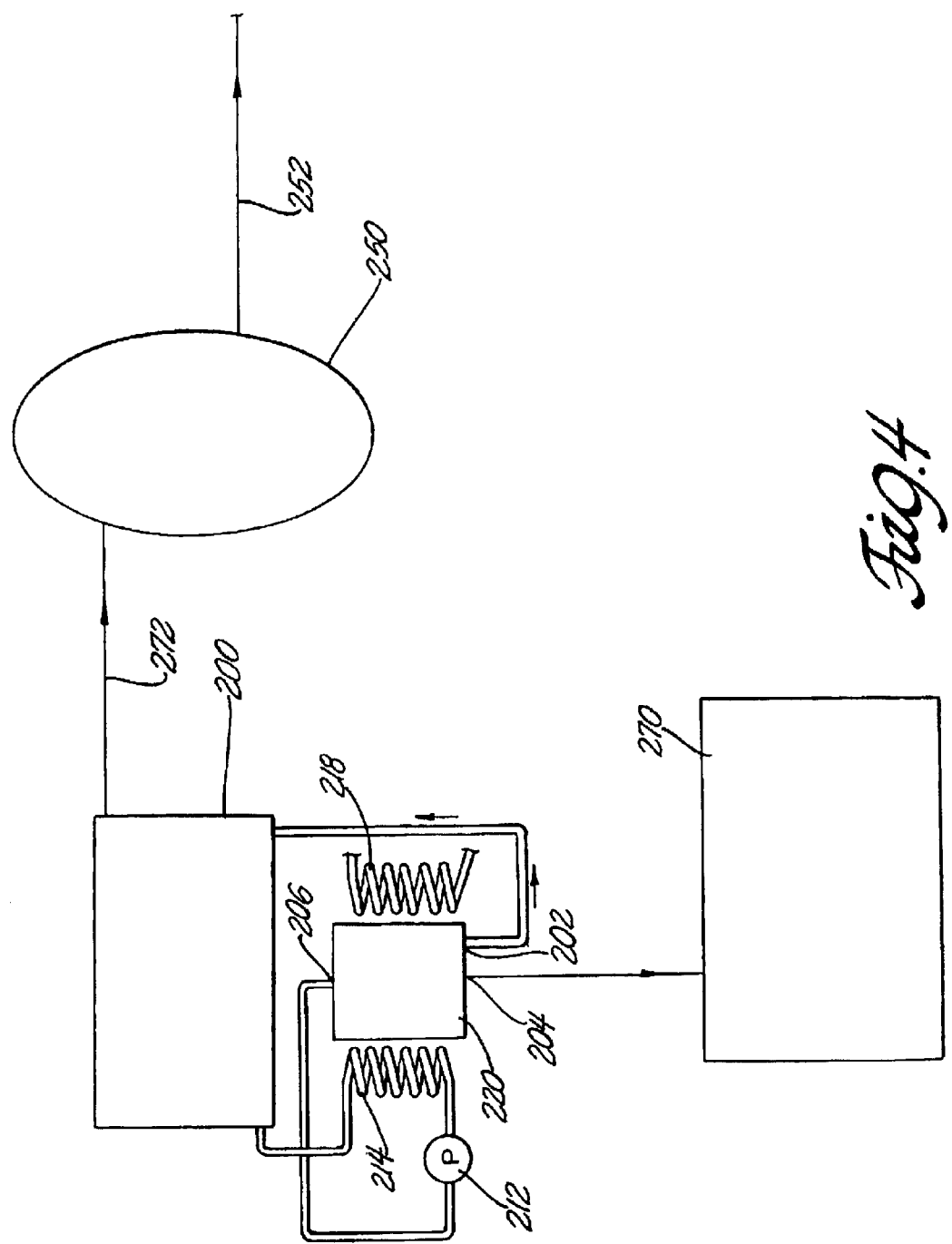

HYDROGEN GENERATION SYSTEM USING STABILIZED BOROHYDRIDES FOR HYDROGEN STORAGE

TECHNICAL FIELD

This invention relates to hydrogen generation systems for mobile applications and more specifically, to a process of generating hydrogen from a stabilized slurry of alkali borohydride particles in water typically stored at ambient temperatures.

BACKGROUND OF THE INVENTION

In place of hydrocarbons as a source of energy, hydrogen has been suggested as being a more beneficial alternative. Hydrogen gas can generate more power per gram and emit less, or even no, exhaust pollutants into the atmosphere. However, the difficulty of using hydrogen as a power source is that it is difficult to store, especially in mobile applications.

Hydrogen gas can be stored at high pressure in thick walled vessels. However, the vessels are too heavy, and/or bulky, for vehicles and the high pressure is a concern. Metal hydrides, $MH_x$, contain thermally releasable hydrogen, but only in small, inefficient amounts. Alkali borohydrides contain a higher proportion of hydrogen that can be released by hydrolysis. But this approach, too, is an engineering challenge.

In one system, lithium borohydride particles and water are separately introduced into a pressurized reactor vessel upon demand for hydrogen gas from a fuel cell. The borohydride and water react to form hydrogen and solid by-products. The reactants are thoroughly mixed using paddles or other stirring mechanisms. Heat is applied to initiate hydrolysis and the demanded quantity of hydrogen is then produced.

Another system provides a hydrogen generation system that employs a water-based, alkaline stabilized sodium borohydride solution as a source of hydrogen gas. Upon demand from a fuel cell, the hydride solution, comprising an excess of water, is pumped over a bed of supported ruthenium or other metal catalyst where it hydrolyzes and produces by-products and hydrogen gas. When the fuel cell no longer needs hydrogen, the pumps turns off and the reaction halts. This system requires a significant amount of excess water to prevent by-product covering and deactivation of the catalyst. This limits the hydrogen producing capacity of the system.

Although these borohydride systems provide lower pressure means of storing and generating hydrogen power, improvements are still needed in reducing both the volume and mass of the overall system. Therefore, it is an object of the present invention to provide a hydrogen generation system that is compact, requires a minimal amount of heavy equipment, and does not require an excess of water to produce an optimal yield of hydrogen gas.

SUMMARY OF THE INVENTION

This invention provides a method of generating hydrogen to power a hydrogen consuming device. A system for practicing the method is compact and generates a high yield of hydrogen gas. The method uses a slurry comprising alkali borohydride and water with dissolved hydroxide ion stored, for example, on-board a motorized vehicle in a storage tank. The slurry is desirable because there is a relatively high proportion of hydrogen in alkali borohydrides, especially lithium and sodium borohydride, and the contribution of hydrogen from water used in the hydrolysis reaction. By limiting the water content of the slurry to an amount required for the hydrolysis of the alkali borohydride, a higher hydrogen production efficiency can be obtained. The hydroxide operates as a base stabilizer to inhibit the reaction between borohydride ions and water while in storage at normal ambient conditions experienced by the vehicle. For lithium borohydride, a 1 to 5% by weight lithium hydroxide solution is suitable. Likewise, a 1 to 5% by weight of sodium hydroxide solution is suitable for sodium hydroxide slurries.

Upon demand from a hydrogen consuming device, a portion of the slurry is conveyed to a suitable axial flow through reactor where the wetted borohydride particles hydrolyze to produce a demanded quantity of hydrogen gas, water vapor and solid by-products. The slurry must be heated to a temperature of, e.g., 120° C. where the hydrolysis reaction is self-sustaining and exothermic. Various heating practices are suitable.

The slurry can be heated prior to entering the reactor vessel using waste heat from the reactor or a supplemental electric heater. In addition, a controllable electric heat source is preferably used to heat the reactor to reach and maintain reaction temperatures of at least 120° C. Once initiated, the reactor temperature can usually be maintained by the heat of the hydrolysis reaction. Thus, supplemental heating is used to maintain reaction temperatures only if the amount of heat generated during hydrolysis is insufficient.

As the borohydride particles react with water, hydrogen gas is generated along with solid by-products. The generated hydrogen increases pressure in the flow reactor. The solid by-products include alkali metaborate and hydroxide containing compounds which tend to coat unreacted hydride particles and inhibit further hydrolysis. Any non-consumed water, some in the vapor state, will remain as well.

The stabilized slurry is moved from storage to the reactor via a pump or other suitable two-phase transport system. A suitable seal mechanism is provided at the entrance of the reactor to prevent back flow of hydrogen. When the immediate requirement for hydrogen is satisfied, the pumping of reactants is stopped and the seal mechanism closed.

In a preferred embodiment, the hydrolysis reactor is an elongated cylinder adapted for flow of the lithium or sodium borohydride particles/water slurry from an entrance and to an exit. As hydrolysis occurs in the reactor, the borohydride particles are consumed. Hydrogen gas is, of course, formed along with solid by-product foam masses. The pressure of the hydrogen and gravity (if the reactor is inclined or vertical) help to move the reacting solid mass through the reactor.

To assure reaction of the borohydride particles and to increase the yield of hydrogen gas produced, the reactor vessel preferably includes a tri-functional mixing element. First, the mixing element is a shearing device used to remove by-products coated on the borohydride particles to expose the particles to remaining water and water loosely held in the form of hydrates. Second, the mixing element is a grinding device to crush by-product particle agglomerations into a fine, polydisperse powder. As a powder, by-product waste can be easily and compactly stored in a by-products storage vessel. Third, the mixing element operates as a two-phase mass handling device that transports solid and liquid-phase materials axially through the reactor while allowing hydrogen to exit the reactor. A pair of parallel, closely spaced, counter rotating augers supported between the ends of the reactor provides those three functions.

The delivery of slurry to the reactor is controlled so that a suitable gas space for the formed hydrogen is retained as the augers are moving, mixing and grinding the mixture of solid borohydride and solid foamed by-products. Preferably, the gas space is just as large as the borohydride-water-solid by-product mass.

In one embodiment of the invention, the reaction products are conveyed from the reactor to an unheated by-products storage vessel that includes a gas/vapor space. This vessel facilitates separation of hydrogen from solid by-products. In addition to the mixing element used in the reactor vessel, a supplemental grinding mechanism may be desirable downstream of the reactor to complete crushing of by-product masses before they enter the by-products storage vessel. In this embodiment, the solid-phase components collect in the bottom of the storage vessel while hydrogen gas and any water vapor can be removed from the top. Usually, the hydrogen/water vapor mixture will flow due to the pressure of the generated hydrogen. The temperature of the unheated storage vessel will normally be cooler than the reactor and some of the water vapor generated in the reactor will condense in the by-products storage vessel. In applications where minimizing volume is essential, the by-products may be stored in the same physical vessel as the reactant, separated by a moving divider, or held in two bladders.

Hydrogen is vented from the by-products storage vessel directly to the hydrogen consuming device or to a buffer container. If the pressure of the hydrogen from the by-products storage tank is not high enough to enter the buffer container, a screw compressor or other pressure increasing device may be employed. Thus, the method of this invention uses a storage container for the borohydride slurry, a heated reactor for the hydrolysis of the borohydride and a by-product storage vessel (possibly cooperatively using the storage vessel) for the mixed borate by-products, and for separation of the hydrogen gas demanded by a vehicle engine or other hydrogen consuming device.

As generated, the hydrogen gas usually contains water vapor. Some hydrogen systems may require reduction of the water content. Thus, in another embodiment, the water vapor content of the hydrogen gas from by-product storage is further reduced before the hydrogen is sent to a buffer container. Specifically, the hydrogen and water vapor are directed to the bottom of the slurry storage tank where they bubble through the slurry. The relatively cool storage tank allows some of the water vapor to condense and remain in the slurry. Thus, water needed for the hydrolysis is conserved and drier, lower temperature hydrogen is conveyed to the hydrogen buffer container.

In a third embodiment, a hydrogen generation system is provided that uses a heated flow reactor including both mixing and supplemental grinding functions. This longer reactor vessel includes a grinding mechanism to more completely pulverize by-product masses and expose unreacted borohydride particles to water and hydrates. The reaction products are then conveyed to a by-products storage vessel from the reactor's outlet. Again, the hydrogen gas and any water vapor flow to either a hydrogen buffer cavity or to the hydrogen consuming device.

In a fourth embodiment, either the reactor vessel outlet or a separate element downstream comprises a gas/solid separation unit to generate two outlet streams; a gaseous-phase stream and a solid-phase stream. The gas stream generated, comprising hydrogen gas and remaining water vapor, flows back into the fuel supply storage vessel where part of the water condenses in the slurry. The hydrogen then continues on to the hydrogen buffer. The solid stream components are conveyed directly to a by-products storage vessel.

In all embodiments, valves controlled at the inlet of the hydrogen buffer may be added to isolate segments when the vehicle or hydrogen user is turned off. This will facilitate either removal or replacement of the hydrogen generating system, or removal of by-products and refueling of slurry with minimal hydrogen release. Furthermore, the practice does have energy requirements in that the reactor must be heated to initiate hydrolysis and mixing and grinding of the solid/liquid/gas mixture is required.

Generally, the present invention involves the transport of thick, wetted solid material into a reactor vessel. The slurry comprises a sufficient amount of water to generate a demanded quantity of hydrogen and is consumed as the hydrogen is generated. The result is a mixture of two phases, where foamy by-products comprising larger particle sizes must be transported out of the reaction zone. Thus, the material exiting the reactor is a thicker mass of by-product material than the slurry that entered the reactor. Therefore, the methods of practicing the present invention require systems that can be adapted to and capable of handling such materials that are relatively difficult to transport.

These and other objects and advantages of this invention will become apparent from a detailed description of the specific embodiments that follow.

BRIEF DESCRIPTION OF THE DRAWINGS

FIG. 3 is a schematic view of a hydrogen generation system combining a supplemental grinding function at the outlet of an elongated stirred, flow reactor.

FIG. 4 is a schematic view of a hydrogen generation process in which hydrogen is taken directly from the outlet of the reactor.

DESCRIPTION OF THE EMBODIMENTS

Figure 1:
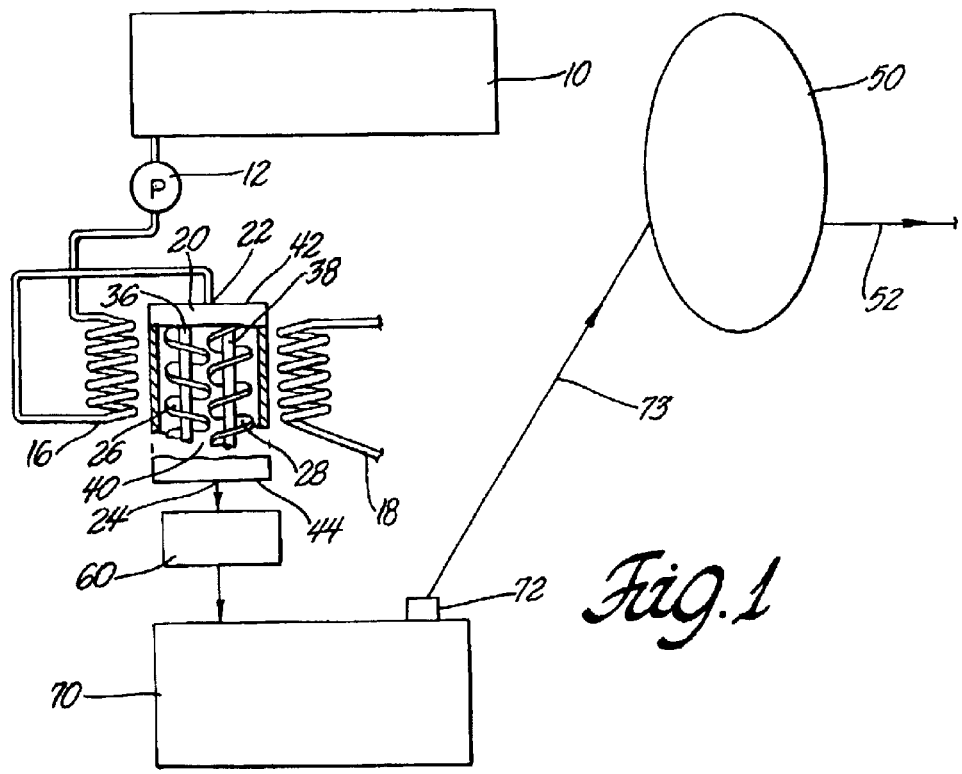
FIG. 1 is a schematic view of a hydrogen generation system for the practice of a method where hydrogen gas is generated by hydrolysis of a aqueous lithium borohydride slurry and hydrogen is conveyed directly to a hydrogen buffer container from a by-products storage vessel.

A method is provided that generates hydrogen for a hydrogen consuming device, e.g., a fuel cell. The method permits the entire hydrogen generation system to be sealed and contained on-board a vehicle. Hydrogen is stored on-board a motorized vehicle in a slurry of borohydride particles and water. Lithium borohydride is preferred for use in the method of this invention because it has the highest mass of hydrogen for a given mass of hydride, and is the lightest borohydride available. Furthermore, it generates substantial heat upon hydrolysis reducing the requirement for a supplemental heat source. Sodium borohydride, on the other hand, is more easily stabilized in the form of a slurry.

The slurry provides a stoichiometrically balanced (i.e., substantially chemical equivalent) amount of borohydride and water. For a lithium borohydride slurry, preferably about 35 weight percent of lithium borohydride is mixed with 65 weight percent of hydroxide solution, thus providing a fairly thick water-based solution, or slurry. Preferably, the hydride constitutes 33 to 37 weight percent of the slurry for optimum production of hydrogen gas. Higher or lower water contents will lower the yield of hydrogen produced. Furthermore, excess water will consume much of the heat that is generated during hydrolysis. For sodium borohydride, preferably 45 weight percent hydride is mixed with 55 weight percent of hydroxide solution. The lithium borohydride and sodium borohydride are suitably in the form of granules, pellets or ground particles or the like. Preferably, the borohydride solids are approximately 40 to 80 mesh in size.

The hydroxide ion present in the slurry operates as a base stabilizer to inhibit the reaction between borohydride ions and water while in storage at normal ambient conditions experienced by the vehicle. For lithium borohydride, a 1 to 5% by weight lithium hydroxide solution is suitable. Likewise, a 1 to 5% by weight of sodium hydroxide solution is suitable for sodium hydroxide slurries.

Hydrogen is generated by hydrolyzing the borohydride. Specifically, this reaction is controlled to produce a demanded quantity of hydrogen gas. The hydrogen gas increases the pressure of this closed system. Borate-containing solid by-products and heat are also produced in the reaction. Most of the water is consumed in the reaction, however a relatively small amount of water will remain. The overall reaction between lithium borohydride and water may occur in several ways as follows:

$$LiBH_4 \rightarrow Li^+ + BH_4^-$$

$$BH_4^- + 2H_2O \rightarrow 4H2 + BO_2^-$$

$$BH_4^- + 4H_2O \rightarrow 4H2 + B(OH)_4^-$$

$$BH_4^- + 10H_2O \rightarrow 4H2 + B(OH)_4^- \cdot 6H_2O$$

The rate-limiting step in any of the hydrolysis reactions is the removal of the first hydrogen atom from the $BH_4^-$ ion. This step is known as acid catalyzation. The degree of reaction at low temperature depends on both the pH and the alkali element. Generally, the pH should be about 14. Thus, to inhibit the reaction and to prevent hydrogen from naturally being produced in storage, a base stabilizer, preferably lithium hydroxide or sodium hydroxide, is necessary.

FIG. 1 schematically illustrates a system for the practice of a first embodiment of the present invention. The borohydride slurry is stored on-board a motorized vehicle in tank 10 at ambient temperatures. The slurry of lithium borohydride particles is fairly thick. Thus, agitation of the slurry at the time of hydrogen demand by suitable stirring or screw-type delivery means (not shown) may be used. Since the slurry is quite alkaline due to the presence of the hydroxide ion, storage tank 10 is made of, or lined with, a base-resistant material such as HDPE, or other appropriate plastics, or materials. Metallic vessels, however, should be avoided because some metals will catalyze the formation of hydrogen at lower temperatures.

Hydrogen gas production is to be activated on request by a hydrogen consuming device, e.g., a vehicle fuel cell (not shown), to which a specific quantity of hydrogen gas is delivered when needed. Usually the generated hydrogen will be directed to a buffer container 50 and then delivered from buffer 50 through line 52 to a fuel cell, or other hydrogen consuming device. When the hydrogen pressure or content of buffer 50 drops below a predetermined level, the hydrogen generation system is activated by means of a control module (not shown), or the like, to supply buffer 50 with more hydrogen gas.

When the hydrogen generation system is activated, a portion of the slurry stored in storage tank 10 is pumped to a heated and stirred flow reactor 20. The method of this invention contemplates use of a screw pump 12 or other positive displacement device capable of delivering a consistent known quantity of slurry to reactor 20.

The slurry reactants enter reactor 20 where hydrolysis occurs at a suitable temperature for hydrolysis. Thus, the temperature of reactor 20 is managed by supplemental heating and cooling source 18. Hydrolysis of lithium borohydride is initiated at 90° C. and is completed at about 120° C. With a suitable reaction mass, a significant amount of heat upon reaction is provided by the hydrolysis of the borohydride. Thus, a continuous application of additional heat to reactor 20 may not be necessary. However, the slurry can be pre-heated using a second supplemental heat source 16 before entering the reaction zone 20. This lowers the amount of additional heat necessary during hydrolysis, thus lowering the overall economics of the reaction system and making it more desirable to use excess heat from the reactor to pre-heat the slurry.

In its simplest conception, reactor 20 is a heated tube with an inlet 22 for the flow of the unreacted slurry, and an outlet 24 for the flow of the products produced from the reaction. Pressure sealing means (not shown) is provided at inlet 22 to prevent back flow to the storage vessel 10. In general, reactor 20 can be either a uniform diameter tube or a tube with a continuously increasing inner diameter to help facilitate the exit of large (multi-inch), solid by-product particles, specifically lithium metaborate foam. Furthermore, the vessel of reactor 20 preferably is insulated for thermal management.

The method of this invention uses a stirred axial-flow reactor that includes a mixing/grinding element therein to free trapped lithium borohydride particles from large by-product solids formed at borohydride surfaces. More specifically, reactor 20 is a tubular reactor that comprises two augers 26, 28. Augers 26, 28 are continuous mixing/grinding elements integrally attached to the ends 42, 44 of reactor tube 20. Each auger 26, 28 comprises a single continuous helical thread carried on a shaft, respectively, 36, 38. Preferably, the aligned parallel, closely together and are rotated in opposing directions. The reach of the outer edges of the threads of augers 26, 28 overlap, for example, at the center 40, and thus produces an "8" in a cross sectional view of the dual auger configuration.

In operation, the dual helix counter-rotating configuration provides multiple functions. The helical edges of auger 26 pass very closely to the helical edges of auger 28. In this way the augers 26, 28 provide a crushing or grinding mechanism so that large foamed by-product particles are ground into more transportable and storable particles. The smaller particle size allows storage of a greater amount of by-product particles. Furthermore, mixing takes place as the slurry is conveyed through reactor 20 and is formed along augers 26, 28, thus promoting further reaction.

In addition to crushing solid by-product particles, the rotating augers promote axial flow of reaction products pushing them through reactor 20 and out of the reaction zone. Thus, reactor 20 is also a two-phase mass handling device. The slurry enters reactor 20 and is transported by the augers through the vessel using auger augers 26, 28. Augers 26, 28, hydrogen pressure and gravitational forces, if the reactor is inclined, contribute to mass transport of reaction products out of reactor 20 and to a by-products storage vessel 70.

The delivery of slurry to reactor 20 is managed so that the reactor is not full of solid reactants and by-products. A space is retained for the hydrogen gas formed in the reactor. Preferably, the gas space is as large as the reactor volume occupied by the borohydride-water-solid by-product mass.

Because of the solid content of the reaction products formed in reactor 20, it may be preferred to employ a supplemental grinding mechanism 60 designed specifically for the by-product solids. As shown in FIG. 1, reaction products exit reactor 20 and are transported into mechanism 60 designed specifically for grinding. Grinding mechanism 60 can be any suitable mechanism such as a roller grinder. Another auger forcing the solids through a screen may be suitable. The grinding mechanism 60 crushes any remaining by-product into small particle sizes before conveying all reaction products to by-products storage vessel 70.

By-products storage vessel 70 is a container adapted to receive the solid by-products to accommodate separation of the hydrogen from the solid by-products and temporarily contain hydrogen under pressure. It is emptied occasionally as borate-containing by-products are accumulated. As reaction products flow into by-products storage vessel 70, inertia and gravity will cause solid by-products to settle to the bottom of storage vessel 70, whereas hydrogen gas will rise to the top. The pressure built up inside storage vessel 70 will push the hydrogen gas out of storage vessel 70 and through a mesh filter 72 to remove any solids from the gas stream. The hydrogen gas is then conveyed directly through line 73 to hydrogen buffer container 50 or to the hydrogen consuming device.

Hydrogen buffer container 50 is a vessel used to store hydrogen gas at moderate pressures. Buffer containers are often used to provide a margin between different operating components in the hydrogen generation process or between the process and the hydrogen consuming device. Thus, a buffer container is designed to afford enough time to allow one part of a process to catch up while another part continues its operation. Buffer container 50 is sized for each particular application to ensure the suitable supply of hydrogen gas. Buffer container 50 can also include a vent that allows any condensed water vapor to drain from cavity 50. For compactness, the by-products storage tank 70 can be expanded and serve as both a by-product storage area and a buffer.

When the hydrogen consuming device needs power, hydrogen will be supplied directly from buffer container 50. Meanwhile, buffer cavity 50 will send a signal to the hydrogen generation system that it is low on hydrogen stock.

Figure 2:
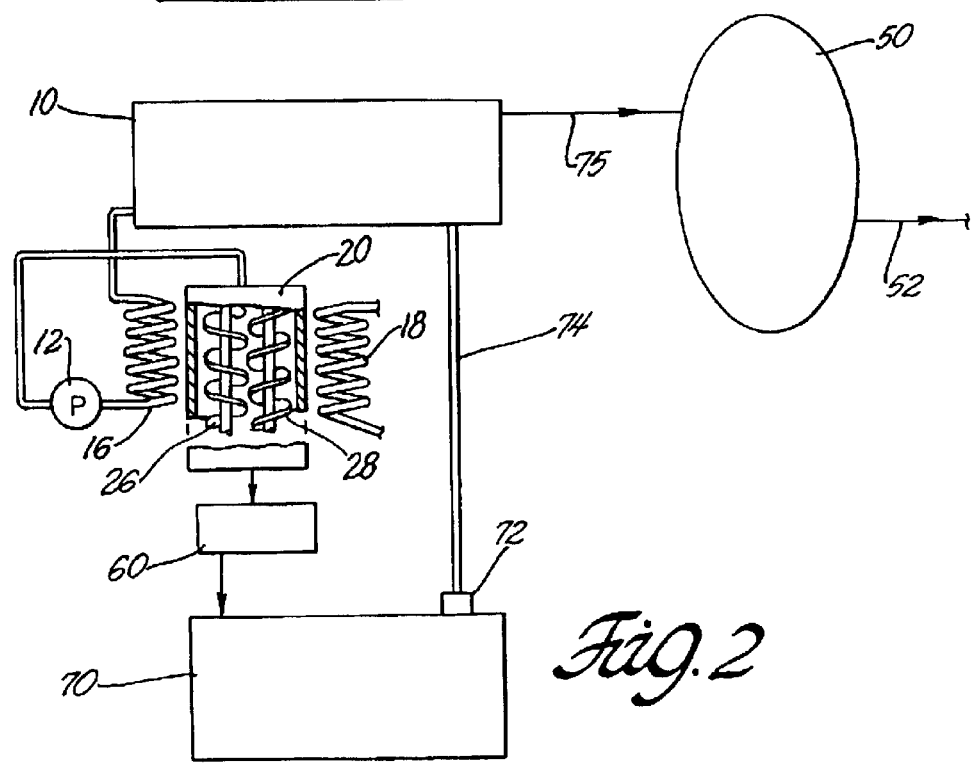
FIG. 2 is a schematic view of a hydrogen generation system like that of FIG. 1 where a hydrogen/water vapor stream is stripped of water vapor in a slurry storage vessel.

FIG. 2 illustrates a second embodiment of the invention. The process in this embodiment is like that shown FIG. 1 except that hydrogen gas and water vapor are conveyed through line 74 and back into storage tank 10 after they are conveyed to by-products storage vessel 70. Hydrogen gas and water vapor enter storage tank 10 and bubble through the slurry. The cooler temperatures causes some water vapor to condense and remain in tank 10. The hydrogen gas from tank 10 flows through line 75 into hydrogen buffer container 50 or directly to the hydrogen consuming device (not shown).

FIG. 3 illustrates a third embodiment of the present invention. Again, hydrogen is stored in a stabilized slurry of borohydride and water in a storage tank 100. In this embodiment, a valve 102 is opened and allows a portion of the slurry to enter a reactor 120 when hydrogen gas is demanded from the hydrogen consuming device (not shown). The hydrogen generation system is activated by a control module (not shown), or the like. Hydrolysis of lithium borohydride occurs at a suitable temperature in a reactor/grinder vessel 120 using a supplemental, electric, heat source 122.

Reactor/grinder 120 is longer vessel providing both a reaction zone and a grinding zone. It comprises dual augers 126, 128 for the reaction zone and a downstream zone for a more specialized grinding apparatus (not shown). The reactor/grinder vessel reduces the number of equipment items to achieve hydrogen output. Reactor/grinder 120 is initially heated in part to start hydrolysis, and then will react residual water in vapor and hydrate form with the cores of the particles exposed during crushing movement down the second half of reactor/grinder 120. Reactor/grinder 120 comprises two augers 126, 128 as previously described in FIG. 1.

The elongated reactor/grinder vessel 120 provides a beneficial combination of the separate reactor and grinding stages provided for in FIGS. 1 and 2. The longer reactor/grinder vessel 120 is maintained at reaction temperatures, thus allowing complete reaction between all borohydride particles, both before and after grinding, with water molecules causing less unreacted borohydride particles to exit the reaction zone as waste. By ensuring that all of the hydride has reacted, the hydrogen production for a system of given weight and volume is maximized. The reaction products, including hydrogen gas, leave reactor/grinder 120 and enter by-products storage vessel 170. Pressure inside by-products storage vessel 170 pushes the hydrogen gas out of vessel 170, through a solids filter 172 to remove any solid particles in the gaseous stream, and through line 173 to either hydrogen buffer container 150 or directly to the hydrogen consuming device (not shown). If a buffer container 150 is used, hydrogen will be delivered through line 152 to the hydrogen consuming device.

FIG. 4 illustrates a fourth embodiment of the present invention. Again, hydrogen gas is stored in a stabilized slurry of alkali borohydride and water in a storage tank 200. Upon demand from a fuel cell by means of a control module (not shown), or the like, the slurry is pumped via a two-phase mass material conveying device 212 to a reactor 220. Before entering reactor 220 at reactor inlet 206, the slurry can be pre-heated using a supplemental heating source 214.

Reactor 220 is provided as a dual auger reactor comprising a heater 218 and two outlet streams; a gaseous stream 202 and a solids stream 204. Either the reactor outlet or a separate element downstream comprises a gas/solid separation zone to generate the two outlet streams 202, 204. The gaseous stream 202 is conveyed by means of pressure and gravitational (how gravity) forces back into fuel supply storage tank 200 where it bubbles through the slurry stored therein. The cooler temperatures of tank 200 will cool the gaseous stream 202 and condense some of the water vapor. The hydrogen gas flows out of storage tank 200 by pressure and is delivered through line 272 to either a buffer container 250 or directly to the hydrogen consuming device (not shown). If a buffer container 250 is used, hydrogen will be delivered through line 252 to the hydrogen consuming device.

Meanwhile, solid by-products, including any unreacted borohydride exit reactor 220 in solids stream 204. These components are then conveyed into a pressurized by-product storage vessel 270, where they are stored until vessel 270 fills up. These components will then be removed and converted to a hydride or otherwise disposed of.

In all of the foregoing embodiments, the entire fuel system pressurizes itself via the generation of hydrogen gas in the reactor thus, forcing all hydrogen flow to the hydrogen consuming device. The buffer container preferably has a relief valve or back pressure regulator to release pressure if it is too high. Shut off valves (not shown) may be needed in the system to facilitate fueling or tank exchange. Furthermore, the system of stored reactants, the reactor, and the stored by-products can be treated as a single unit which will be removed and replaced together. The reactor is small relative to the storage units. Removal of a single package will reduce the number of operations required to provide new fuel. This ensures that new space is made available for by-products at the same time that new reactants are added so that the by-products storage will never overfill. Finally, the amount of slurry that is fed into a reactor should be limited, but sufficient, to allow the reactor to have space available for hydrogen gas production.

If desired, the by-products storage and slurry storage tanks can be a single vessel with a moving barrier. This is accomplished using a sliding barrier or by incorporating two bladders in a single vessel. As the slurry is used up, either its bladder contracts or the sliding barrier moves to reduce the volume occupied by slurry storage and expand the volume available to by-products storage. This method optimizes space utilization, which can be important in mobile and portable power applications.

While the invention has been described using the aforementioned preferred embodiments, it is not intended to be limited to the above description, but rather only to the extent of the following claims.

What is claimed is:

1. A method of generating hydrogen in a fuel supply system combined with a hydrogen consuming device, said method comprising the steps of:

storing a slurry of lithium and/or sodium borohydride particles in water in a fuel supply storage vessel, said water containing sufficient dissolved hydroxide ion to inhibit chemical reaction with said borohydride at ambient storage temperatures of said slurry, said slurry comprising, by weight, about 1.6 to 2.5 parts of water per 1 part of lithium borohydride, or 1 to 1.5 parts of water per 1 part of sodium borohydride;

conveying a portion of said slurry to the inlet of an axial flow-through reactor upon demand for hydrogen from said hydrogen consuming device, said reactor having a reaction zone;

reacting said borohydride particles and water in said reaction zone at a temperature above approximately 90° C. to produce reaction products comprising hydrogen gas and solid by-products while mixing said borohydride particles and solid by-products in said reaction zone to expose unreacted borohydride particle surfaces for reaction with said water, and conveying the mixed materials through said reaction zone, said mixing and conveying using two rotating augers, the rate of conveying of said slurry to said reactor being controlled so as to retain a hydrogen gas volume in said reaction zone;

removing said reaction products from said reactor; and conveying said hydrogen gas to said hydrogen consuming device or to a hydrogen buffer container for said device.

2. A method as recited in claim 1, comprising pre-heating said slurry before it enters said reactor.

3. A method as recited in claim 1, comprising reacting said borohydride particles at temperatures of at least 120° C.

4. A method as recited in claim 1, comprising grinding said solid by-products and conveying them to an unheated by-products storage vessel.

5. A method as recited in claim 1, further comprising conveying said hydrogen gas from said reactor to said fuel supply storage vessel before conveying said hydrogen to said hydrogen consuming device or buffer.

6. A method as recited in claim 1, comprising conveying said reaction products from said reactor to a grinding mechanism for comminution of said solid by-product.

7. A method as recited in claim 6, further comprising conveying said hydrogen gas, water vapor and said solid by-products from said grinding operation to a by-products storage vessel.

8. A method as recited in claim 7, further comprising conveying said hydrogen gas and any vaporized water from said by-products storage vessel to said slurry in said fuel supply vessel to condense at least a portion of said water vapor.

9. A method as recited in claim 1, comprising separately storing said by-products and said slurry in said fuel supply storage vessel.

10. A method of generating hydrogen in a fuel supply system combined with a hydrogen consuming device, said method comprising the steps of:

storing a slurry of lithium and/or sodium borohydride particles in water in a fuel supply storage vessel, said water containing sufficient dissolved hydroxide ion to inhibit chemical reaction with said borohydride at ambient storage temperatures of said slurry, said slurry comprising, by weight, about 1.6 to 2.5 parts of water per 1 part of lithium borohydride, or 1 to 1.5 parts of water per 1 part of sodium borohydride;

conveying a portion of said slurry to the inlet of an axial flow-through reactor upon demand for hydrogen from said hydrogen consuming device, said reactor having a reaction zone and a grinding zone downstream from said reaction zone;

reacting said borohydride particles and water in said reaction zone at a temperature above approximately 90° C. to produce reaction products comprising hydrogen gas and solid by-products while mixing said borohydride particles and solid by-products in said reaction zone to expose unreacted borohydride particle surfaces for reaction with said water, and conveying the mixed materials through said reaction zone, said mixing and conveying using two rotating augers, the rate of conveying of said slurry to said reactor being controlled so as to retain a gas volume in said reaction zone at least as large as the volume of said mixed materials in said reactor;

grinding said solid by-products to a storable particle size in said grinding zone, and conveying them to a by-products storage vessel; and conveying said hydrogen gas to said hydrogen consuming device or to a hydrogen buffer container for said device.

11. A method as recited in claim 10, comprising pre-heating said slurry before entering said reactor.

12. A method as recited in claim 10, comprising reacting said borohydride particles at temperatures of at least 120° C.

13. A method as recited in claim 10, comprising conveying said hydrogen gas and any vaporized water from said by-products storage vessel to said slurry in said fuel supply vessel to condense at least a portion of said water vapor.

14. A method as recited in claim 10, comprising separately storing said by-products and said slurry in said fuel supply vessel.

15. A method of generating hydrogen in a fuel supply system combined with a hydrogen consuming device, said method comprising the steps of:

storing a slurry of lithium and/or sodium borohydride particles in water in a fuel supply storage vessel, said water containing sufficient dissolved hydroxide ion to inhibit chemical reaction with said borohydride at ambient storage temperatures of said slurry, said slurry comprising, by weight, about 1.6 to 2.5 parts of water per 1 part of lithium borohydride, or 1 to 1.5 parts of water per 1 part of sodium borohydride;

conveying a portion of said slurry to an axial flow-through reactor upon demand for hydrogen from said hydrogen consuming device, said reactor having a reaction zone and a gas separation zone;

reacting said borohydride particles and water in said reaction zone at a temperature above approximately 90° C. to produce reaction products comprising hydrogen gas and solid by-products while mixing said borohydride particles and solid by-products in said reaction zone to expose unreacted borohydride particle surfaces for reaction with said water, and conveying the mixed materials through said reaction zone, said mixing and conveying using two rotating augers, the rate of conveying of said slurry to said reactor being controlled so as to retain a gas volume in said reaction zone at least as large as the volume of said mixed materials in said reactor;

separating said hydrogen from said solid by-products in said separation zone and conveying said hydrogen gas from said separation zone to said slurry stored in said fuel supply storage vessel to condense any water vapor in said gas; and conveying said hydrogen gas from said fuel supply storage vessel to said hydrogen consuming device or to a hydrogen buffer container for said device.

16. A method as recited in claim 15, comprising conveying said by-products to a by-products storage vessel.

17. A method as recited in claim 15, comprising reacting said borohydride particles at temperatures of at least 120° C.

18. A method as recited in claim 15, comprising separately storing said by-products and said slurry in said fuel supply vessel.

* * * * *